(12) United States Patent
Rohrmann et al.

(10) Patent No.: US 11,635,063 B2
(45) Date of Patent: Apr. 25, 2023

(54) BEARING ASSEMBLY OF A ROTOR OF A WIND TURBINE, AND WIND TURBINE

(71) Applicant: Renk Aktiengesellschaft, Augsburg (DE)

(72) Inventors: Thorsten Rohrmann, Binder (DE); Lutz Winter, Laatzen (DE); Janina Brencher, Hannover (DE); Peter Decker, Hannover (DE)

(73) Assignee: RENK GMBH, Augsburg (DE)

( * ) Notice: Subject to any disclaimer, the term of this patent is extended or adjusted under 35 U.S.C. 154(b) by 255 days.

(21) Appl. No.: 17/272,153

(22) PCT Filed: Aug. 1, 2019

(86) PCT No.: PCT/EP2019/070807
§ 371 (c)(1),
(2) Date: Feb. 26, 2021

(87) PCT Pub. No.: WO2020/043425
PCT Pub. Date: Mar. 5, 2020

(65) Prior Publication Data
US 2021/0246885 A1    Aug. 12, 2021

(30) Foreign Application Priority Data
Aug. 27, 2018  (DE) .................... 10 2018 120 810.3

(51) Int. Cl.
  *F03D 80/70*    (2016.01)
(52) U.S. Cl.
  CPC .......... *F03D 80/70* (2016.05); *F05B 2240/21* (2013.01); *F16C 2208/36* (2013.01); *F16C 2360/31* (2013.01)

(58) Field of Classification Search
CPC .. F03D 80/70; F05B 2240/21; F16C 2360/31; F16C 17/26
See application file for complete search history.

(56) References Cited

U.S. PATENT DOCUMENTS

| | | | |
|---|---|---|---|
| 9,995,283 B2 * | 6/2018 | Stiesdal | ................. F16C 17/10 |
| 10,669,997 B2 * | 6/2020 | Mtauweg | ................. F03D 9/25 |

(Continued)

FOREIGN PATENT DOCUMENTS

| | | |
|---|---|---|
| EP | 3 219 984 | 9/2017 |
| WO | WO 2011/127510 | 10/2011 |
| WO | WO 2017/077057 | 5/2017 |

OTHER PUBLICATIONS

International Search Report issued in corresponding PCT Application PCT/EP2019/070807.

*Primary Examiner* — Eldon T Brockman
(74) *Attorney, Agent, or Firm* — Cozen O'Connor

(57) ABSTRACT

A bearing assembly of a rotor of a wind turbine, for mounting a shaft of the rotor in a fixed housing, wherein the shaft of the rotor is coupled to rotor blades of the rotor via a hub, includes: a plurality of first housing-side axial slide bearing segments engaging on the housing; a plurality of second housing-side axial slide bearing segments; a plurality of first housing-side radial slide bearing segments; and a plurality of second housing-side radial slide bearing segments. An axial distance between the first and second axial sliding surfaces of the rotor defines a bearing length l. The radial sliding surfaces of the rotor on which the first and second radial slide bearing segments are supported, define a bearing diameter d of the bearing assembly, and V≤1 applies to a ratio V=l/d between the bearing length l and the bearing diameter d.

10 Claims, 2 Drawing Sheets

(56) References Cited

U.S. PATENT DOCUMENTS

| | | | |
|---|---|---|---|
| 2012/0051915 A1* | 3/2012 | Suzuki | F16C 33/08 |
| | | | 475/331 |
| 2015/0051915 A1 | 2/2015 | Moore | |
| 2017/0260970 A1* | 9/2017 | Stiesdal | F16C 33/26 |
| 2019/0195204 A1* | 6/2019 | Mtauweg | F16C 33/18 |

* cited by examiner

BEARING ASSEMBLY OF A ROTOR OF A WIND TURBINE, AND WIND TURBINE

CROSS REFERENCE TO RELATED APPLICATIONS

This is a U.S. national stage of International application No. PCT/EP2019/070807, filed on Aug. 1, 2019, which claims priority to German Application No. 10 2018 120 810.3 filed Aug. 27, 2018, the content of each of which is incorporated herein by reference.

BACKGROUND OF THE INVENTION

1. Field of the Invention

The invention relates to a bearing assembly of a rotor of a wind turbine. The invention, furthermore, relates to a wind turbine having a bearing assembly.

2. Description of the Prior Art

For mounting a rotor of a wind turbine that is coupled to rotor blades of the wind turbine and is driven by the rotor blades of the wind turbine, exclusively rolling bearings have been employed in practice up to now. In the event of a failure of the roller bearing, the entire drive train has to be disassembled. This makes a complete disassembly of the wind turbine necessary.

From WO 2011/127510 a bearing assembly of a rotor of a wind turbine which utilizes slide bearings is known. The bearing assembly comprises at least two slide bearings arranged at an axial distance from one another, which are composed of slide bearing pads, wherein the slide bearings are arranged in planes that are angularly positioned relative to one another. The slide bearing pads of the slide bearings, which provide slide bearing segments, are positioned on a tilted raceway, as a result of which a spherical form of the respective sliding surface is required. Such a spherical form of the respective slide bearing surface can only be produced with major expenditure. A further disadvantage of WO 2011/127510 consists in a large bearing assembly construction.

There is a need for a bearing assembly of a rotor of a wind turbine that can be easily produced, does not require the complete disassembly of the wind turbine in the event of a failure and is of a compact design.

Starting out from this, it is an object of the present invention to create a new type of bearing assembly of a rotor of a wind turbine and a wind turbine having such a bearing assembly.

This object may be solved through a bearing assembly for mounting the rotor of the wind turbine in a fixed housing of the wind turbine comprising at least the following assemblies: firstly housing-side axial slide bearing segments facing the rotor blades or a hub, which engage on the housing, are fixed together with the housing and are supported against a first axial siding surface of the rotor. Second housing-side axial slide bearing segments facing away from the rotor blades or the hub, which engage on the housing, are fixed together with the housing and are supported against a second axial sliding surface of the rotor. Thirdly housing-side radial slide bearing segments facing the rotor blades or the hub, which engage on the housing, are fixed together with the housing and are supported against a first radial sliding surface of the rotor. Fourthly, housing-side radial slide bearing segments facing away from the rotor blades or the hub, which engage on the housing, are fixed together with the housing and are supported against a second radial sliding surface of the rotor. An axial distance between the axial sliding surfaces of the rotor, on which the axial slide bearing segments are supported, defines a bearing length l of the bearing assembly. The radial sliding surfaces of the rotor, on which the radial slide bearing segments are supported, define a bearing diameter d of the bearing assembly. For a ratio $V=l/d$ between the bearing length l and the bearing diameter d the following applies: $V \le 1$. The radial bearing diameters can also be different. The bearing diameter d could also be: front bearing diameter d1 plus rear bearing diameter d2, wherein $d=(d1+d2)/2$.

With compact design and easy producibility, the bearing assembly according to the invention ensures individual access to individual slide bearing segments in the event of a failure. Accordingly, a complete disassembly of the wind turbine is not required in the event of a failure.

Preferably, $0.25 \le V \le 1$ applies to the ratio $V=l/d$ between the bearing length l and the bearing diameter d. Particularly preferably, $0.5<V \le 1$ applies to the ratio $V=l/d$ between the bearing length l and the bearing diameter d. Most preferably, $0.6<V \le 0.9$, in particular $0.7 \le V \le 0.8$ applies to the ratio $V=l/d$ between the bearing length l and the bearing diameter d. These ratios are particularly preferred for providing a compact design.

According to an advantageous further development, the axial slide bearing segments and the radial slide bearing segments each comprise a slide bearing body which is supported on the respective sliding surface of the rotor. The respective sliding surface of the rotor is metallic. The respective slide bearing body is made of PEEK (polyether ether ketone) or of PK (polyketone) at least on the side with which it is supported on the respective sliding surface of the rotor. In particular when the slide bearing body consists of PEEK or of PK at least on that side with which it is supported on the respective sliding surface of the rotor, a compact design of the bearing assembly can be particularly advantageously produced. Bearing bodies, which are at least partially produced from such a material, can safely absorb high bearing loads.

BRIEF DESCRIPTION OF THE DRAWINGS

Preferred further developments of the invention are obtained from the following description. Exemplary embodiments of the invention are explained in more detail by way of the drawing with being restricted to this. In the drawings.

DETAILED DESCRIPTION OF THE PRESENTLY PREFERRED EMBODIMENT

The invention relates to a bearing assembly of a rotor of a wind turbine that is coupled to rotor blades. Such a rotor of the wind turbine is also referred to as main rotor of the wind turbine. The invention, furthermore, relates to a wind turbine having a bearing assembly.

Figure 1:
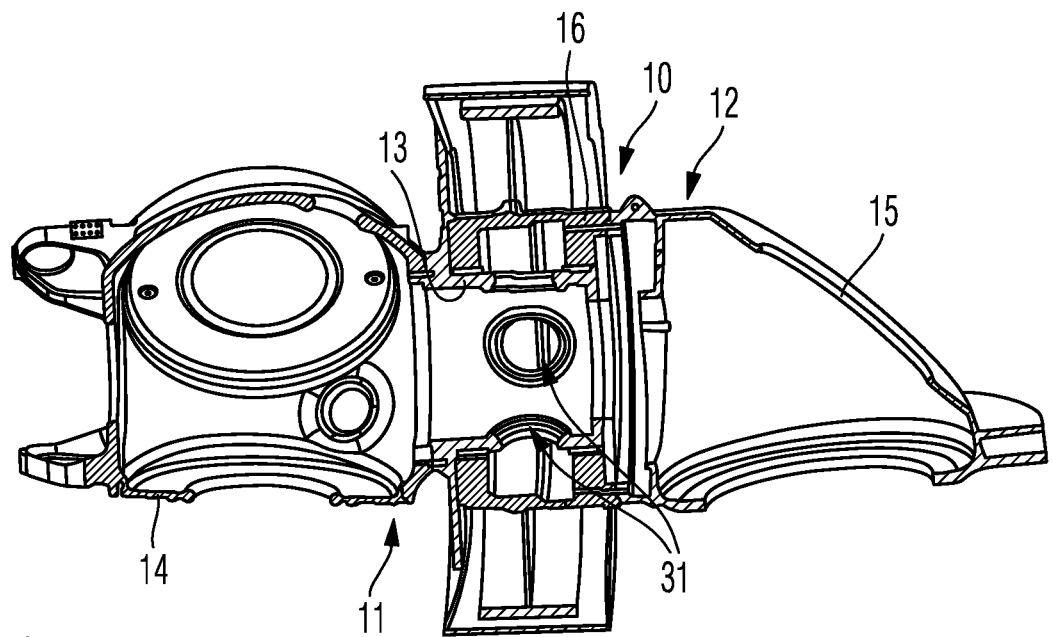
FIG. 1 is a cross section of a bearing assembly of a rotor of a wind turbine according to an aspect of the invention.

FIG. 1 shows an extract from a bearing assembly 10 for a rotor 11 of a wind turbine, which serves for mounting the rotor 11 in a fixed housing 12. Of the rotor 11, a shaft 13 and a hub 14 connected to the shaft 13 are shown, wherein on the hub 14 rotor blades are mounted which are not shown, which are driven by the wind. Of the housing 12, a fixed machine support 15 is shown, on which a housing section 16 engages.

Figure 2:
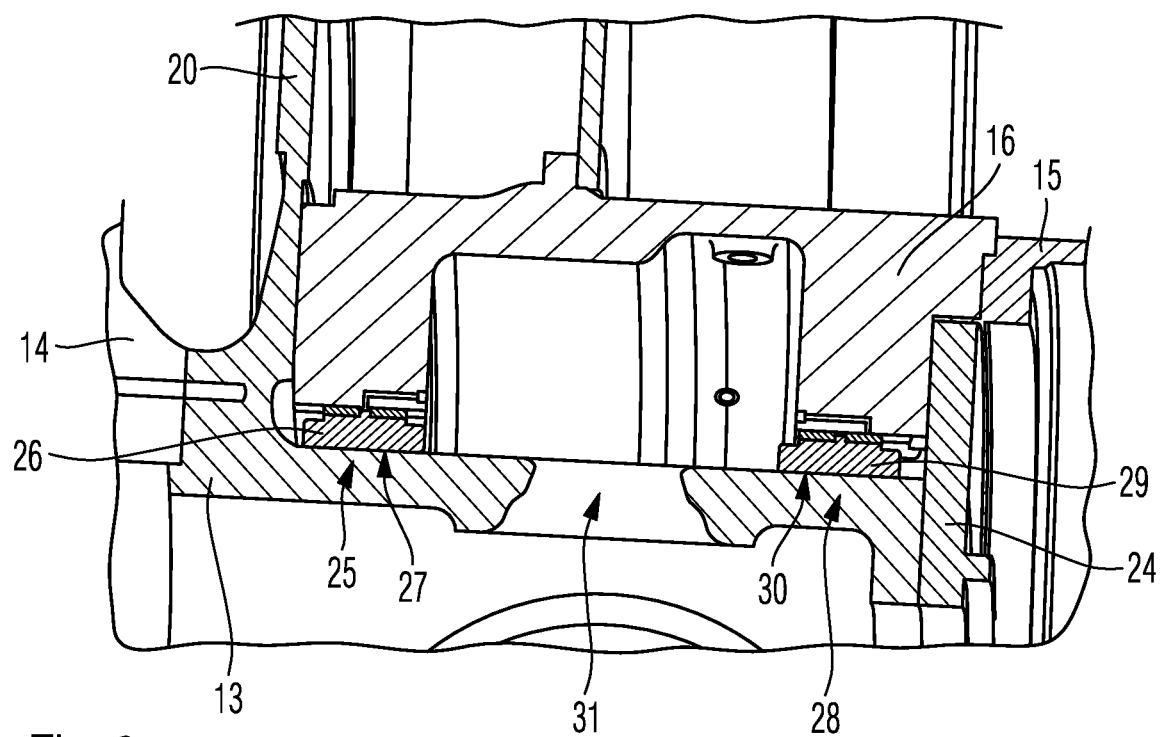
FIG. 2 is a detail of FIG. 1.
Figure 3:
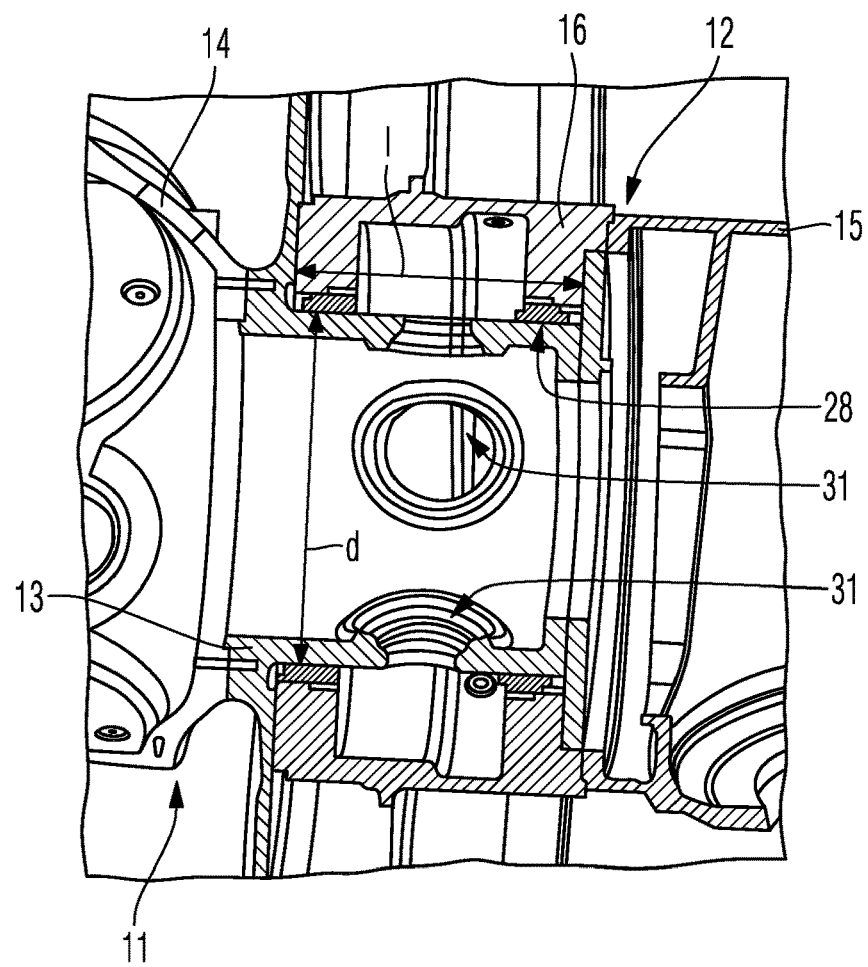
FIG. 3 is a further detail of FIG. 1.
Figure 4:
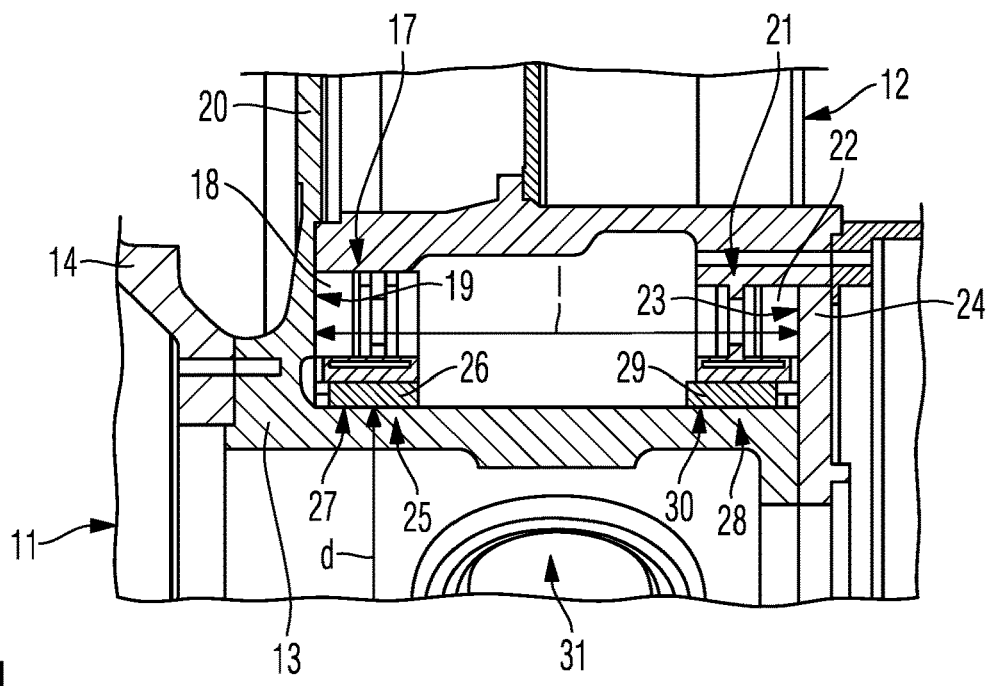
FIG. 4 is a second cross section of the bearing assembly of a rotor of a wind turbine according to the invention.

FIGS. 2, 3 and 4 show different details of the bearing assembly 10 according to FIG. 1, namely different cross sections, wherein in FIGS. 2 and 3 in the cross section chosen there, radial slide bearing segments and in FIG. 4 additionally also axial slide bearing segments are visible.

The bearing assembly 10 comprises housing-side axial slide bearing segments 17 facing the rotor blades or the hub 14, which comprise a sliding body 18. The sliding body 18 of the respective axial slide segment 17, which faces the rotor blades or the hub 14, is connected to the housing section 16, is fixed together with the housing section 16 and is supported against a first axial sliding surface 19 of the shaft 13 of the rotor 11, which is formed by a first axial collar 20 of the rotor 11. This first axial collar 20 is an integral part of the shaft 13.

Furthermore, the bearing assembly 10 comprises housing-side axial slide bearing segments 21 facing away from the rotor blades or from the hub 14, which in turn engage on the housing section 16 of the housing 12, are fixed together with the housing section 16 and the slide bodies 22 of which are supported against a second axial sliding surface 23 of the rotor 11. This second axial sliding surface 23 for the sliding bodies 22 of the axial slide segments 21 facing away from the hub 14 is provided by a further axial collar 24 which is not an integral part of the shaft 13 but is rather connected to the shaft 13 in a fixed manner.

The bearing assembly 10, furthermore, comprises radial slide bearing segments, namely housing-side radial slide bearing segments 25 facing the rotor blades or the hub 14 and housing-side radial slide bearing segments 28 facing away from the rotor blades or the hub 14. The radial slide bearing segments 25, 28 each comprise slide bodies 26, 29 which are connected to the housing 12, wherein the slide bodies 26, 29 of the housing-side radial slide bearing segments 25, 28 are supported against radial sliding surface 27, 30 of the rotor 11, namely of the shaft 13 of the rotor 11.

An axial distance between the axial sliding surfaces 19, 23 of the rotor 11 and thus an axial distance between the sides of the slide bodies 18, 22 of the housing-side axial slide segments 17, 21 facing the rotor or the hub 14 and the housing-side axial slide segments 17, 21 facing away from the rotor blades or the hub 14 supporting themselves on these axial sliding surfaces 19, 23 defines an axial bearing length l of the bearing assembly 10, which is shown in particular in FIGS. 3 and 4. The radial sliding surfaces 27 and 30 of the rotor 11, namely the shaft 13 of the rotor 11, on which the slide bodies 26, 29 of the housing-side radial slide bearing segments 25, 28 are supported or the sides of the slide bodies 26, 29 of the radial slide bearing segments 25, 28 which are supported on these slide bearing surfaces 27, 30 define a bearing diameter d of the bearing assembly 10, which is likewise shown in particular in FIGS. 3 and 4.

$V \leq 1$ applies to a ratio $V=l/d$ between this bearing length l and this bearing diameter d.

Preferably, $0.25 < V \leq 1$ applies to this ratio.

Particularly preferably, $0.5 < V \leq 1$ applies.

Most preferably, $0.6 < V \leq 0.9$, in particular $0.7 < V \leq 0.8$ applies.

The bearing assembly 10 of a rotor 11 of a wind turbine described above utilizes slide bearing segments 17, 21, 25 and 28. Rolling bearings are done without. The slide bearing segments, which are embodied as axial slide bearing segments 17, 21 and radial slide bearing segments 25, 28, do not require any spherical construction. The axial slide bearing segments 17, 21 and the radial slide bearing segments 25, 28 are circularly arranged roundabout the shaft 13 or an axis of rotation of the shaft 13. A compact dimension can be realized. With compact dimensions and simple producibility, individual slide bearing segments can be individually accessed without having to completely disassemble the drive train of the wind turbine. In the event of maintenance, the slide bearing segments 17, 21, 25, 28 are accessible via at least one so-called manhole 31, which is, or are, introduced into the shaft approximately in the axial middle of the bearing assembly 10 between the axial slide bearing segments 17, 21. As explained above, the axial slide bearing segments 17, 21 and the radial slide bearing segment 25, 28 each comprise a slide bearing body 18, 22, 26, 29, which is supported on the respective sliding surface 19, 23, 27, 30 of the rotor 11, namely of the shaft 13 of the rotor 11. The respective sliding surface 19, 23, 27, 30 is embodied metallic.

The respective slide bearing body 18, 22, 26, 29 comprises a PEEK (polyether ether ketone) or PK (polyketone) material at least on that side with which the same is supported on the respective sliding surface 19, 23, 27, 30 of the rotor 11. Such materials can absorb high bearing loads.

Here, the respective sliding body 18, 22, 26, 29 can either consist entirely of such a PEEK or PK material, or carry a segment or a coating of such a PEEK or PK material on the side with which the same is supported on the respective sliding surface 19, 23, 27, 30, which is or are then preferentially applied to a metallic main body of the respective sliding body 18, 22, 26, 29.

The bearing assembly 10 according to the invention is employed in particular in wind turbines without transmission, which are also referred to as direct drive wind turbines. In such direct drive wind turbines, the bearing assembly 10 of very short construction is particularly advantageous.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and equivalent feature combinations.

LIST OF REFERENCE NUMBERS

10 Bearing assembly
11 Rotor
12 Housing
13 Shaft
14 Hub
15 Machine support
16 Housing section
17 Housing-side axial slide bearing segment
18 Sliding body
19 Sliding surface
20 Axial collar
21 Housing-side axial slide bearing segment
22 Sliding body
23 Sliding surface
24 Axial collar 25 Housing-side radial slide bearing segment
26 Sliding body
27 Sliding surface
28 Housing-side radial slide bearing segment
29 Sliding body
30 Sliding surface
31 Manhole

The invention claimed is:

1. A bearing assembly (10) of a rotor (11) of a wind turbine, for mounting a shaft (13) of the rotor (11) in a fixed housing (12), wherein the shaft (13) of the rotor is coupled to rotor blades of the rotor (11) via a hub (14), comprising:
a plurality of first housing-side axial slide bearing segments (17) facing the rotor blades or the hub (14), which plurality of first housing-side axial slide bearing segments (17) engage on the housing (12), are fixed together with the housing (12) and are supported against a first axial sliding surface (19) of the rotor (11);
a plurality of second housing-side axial slide bearing segments (21) facing away from the rotor blades or the hub (14), which plurality of second housing-side axial slide bearing segments (21) engage on the housing (12), are fixed together with the housing (12) and are supported against a second axial sliding surface (23) of the rotor (11);
a plurality of first housing-side radial slide bearing segments (25) facing the rotor blades or the hub (14), which plurality of first housing-side radial slide bearing segments (25) engage on the housing (12), are fixed together with the housing (12) and are supported against a first radial sliding surface (27) of the rotor (11); and
a plurality of second housing-side radial slide bearing segments (28) facing away from the rotor blades or the hub (14), which plurality of second housing-side radial slide bearing segments (28) engage on the housing (12), are fixed together with the housing (12) and are supported against a second radial sliding surface (30) of the rotor (11),
wherein an axial distance between the first and second axial sliding surfaces (19, 23) of the rotor (11), on which the first and second axial slide bearing segments (17, 21) are supported, defines a bearing length l of the bearing assembly (10),
wherein the radial sliding surfaces (27, 30) of the rotor (11) on which the first and second radial slide bearing segments (25, 28) are supported, define a bearing diameter d of the bearing assembly (10), and
wherein $V \leq 1$ applies to a ratio $V = l/d$ between the bearing length l and the bearing diameter d.

2. The bearing assembly according to claim 1, wherein $0.5 \leq V \leq 1$ applies to the ratio $V = l/d$ between the bearing length l and the bearing diameter d.

3. The bearing assembly according to claim 1, wherein $0.6 \leq V \leq 0.9$ applies to the ratio $V = l/d$ between the bearing length l and the bearing diameter d.

4. The bearing assembly according to claim 1, wherein $0.7 \leq V \leq 0.8$ applies to the ratio $V = l/d$ between the bearing length l and the bearing diameter d.

5. The bearing assembly according to claim 1, wherein:
the first and second axial slide bearing segments (17, 21) and the first and second radial slide bearing segments (25, 28) each comprise a slide bearing body (18, 22, 26, 29) supported on the respective sliding surface (19, 23, 27, 30) of the rotor (11),
the respective sliding surface (19, 23, 27, 30) of the rotor is metallic, and
the respective slide bearing body (18, 22, 26, 29) has a metallic main body, which on a side with which the slide bearing body (18, 22, 26, 29) is supported on the respective sliding surface (19, 23, 27, 30) of the rotor (11), has a PEEK (polyether ether ketone) coating.

6. The bearing assembly according to claim 1, wherein:
the first and second axial slide bearing segments (17, 21) and the first and second radial slide bearing segments (25, 28) each comprise a slide bearing body (18, 22, 26, 29), which is supported on the respective sliding surface (19, 23, 27, 30) of the rotor (11)
the respective sliding surface (19, 23, 27, 30) of the rotor is metallic, and
the respective slide bearing body (18, 22, 26, 29) consists entirely of PEEK (polyether ether ketone).

7. The bearing assembly according to claim 1, wherein:
the first and second axial slide bearing segments (17, 21) and first and second radial slide bearing segments (25, 28) each comprise a slide bearing body (18, 22, 26, 29) supported on the respective sliding surface (19, 23, 27, 30) of the rotor (11),
the respective sliding surface (19, 23, 27, 30) of the rotor is metallic, and
the respective slide bearing body (18, 22, 26, 29) has a metallic main body, which on a side with which the slide bearing body (18, 22, 26, 29) is supported on the respective sliding surface (19, 23, 27, 30) of the rotor (11), has a PK (polyketone) coating.

8. The bearing assembly according to claim 1, wherein:
the first and second axial slide bearing segments (17, 21) and first and second radial slide bearing segments (25, 28) each comprise a slide bearing body (18, 22, 26, 29), supported on the respective sliding surface (19, 23, 27, 30) of the rotor (11),
the respective sliding surface (19, 23, 27, 30) of the rotor is metallic, and
the respective slide bearing body (18, 22, 26, 29) consists entirely of PK (polyketone).

9. A wind turbine comprising:
a rotor (11);
a housing (12); and
the bearing assembly (10) according to claim 1.

10. The wind turbine according to claim 9, wherein the wind turbine is a transmissionless direct-drive wind turbine.

* * * * *